United States Patent
Nicholas et al.

(10) Patent No.: US 11,592,882 B2
(45) Date of Patent: Feb. 28, 2023

(54) VARIABLE FIN STACK

(71) Applicant: Dell Products L.P., Round Rock, TX (US)

(72) Inventors: Ken Nicholas, Leander, TX (US); Qinghong He, Austin, TX (US); Jay Matthew Zill, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 223 days.

(21) Appl. No.: 16/893,719

(22) Filed: Jun. 5, 2020

(65) Prior Publication Data

US 2021/0382532 A1      Dec. 9, 2021

(51) Int. Cl.
    *G06F 1/20*   (2006.01)
    *F28D 15/02*  (2006.01)
    *F28F 3/02*   (2006.01)

(52) U.S. Cl.
    CPC ......... *G06F 1/203* (2013.01); *F28D 15/0208* (2013.01); *F28F 3/02* (2013.01); *F28D 15/0241* (2013.01); *F28F 2215/14* (2013.01); *F28F 2255/02* (2013.01)

(58) Field of Classification Search
    CPC ........ F28D 15/0241; G06F 1/20; G06F 1/203; F28F 2255/02
    See application file for complete search history.

(56) References Cited

U.S. PATENT DOCUMENTS

| | | | |
|---|---|---|---|
| 2005/0248918 A1* | 11/2005 | Lin | G06F 1/20 361/679.48 |
| 2013/0027873 A1* | 1/2013 | Chen | G06F 1/203 361/695 |
| 2018/0031329 A1* | 2/2018 | Wang | G06F 1/203 |
| 2019/0045663 A1* | 2/2019 | Shia | H01L 23/427 |

FOREIGN PATENT DOCUMENTS

| | | | |
|---|---|---|---|
| CN | 103687423 A | * | 3/2014 |
| WO | WO-2019196410 A1 | * | 10/2019 ......... H01L 27/1218 |

OTHER PUBLICATIONS

Press Release—ASUS Announces Digital Solutions for Content Creators, Business Professionals, health and Fitness Enthusiasts, and Gamers at IFA 2019, ASUS, Sep. 4, 2019, 9 pages, internet—https://press.asus.com/#/news/details?solo=160 --.

(Continued)

*Primary Examiner* — Eric S Ruppert
(74) *Attorney, Agent, or Firm* — McDermott Will & Emery LLP (57) ABSTRACT

A variable fin stack for cooling components in a chassis of a portable information handling system. The variable fin stack comprises a first array of fins coupled to a first conduit and a second array of fins coupled to a second conduit. When the chassis is in a compact configuration for use in a mobile mode, fins in the second array of fins are positioned between fins in the first array of fins and the chassis maintains a form factor. When the chassis is in an expanded configuration for use in a workstation mode, the second array of fins is withdrawn from the first array of fins and the increased (Continued)

surface area provides increased cooling of components operating at higher power levels.

20 Claims, 7 Drawing Sheets

(56) References Cited

OTHER PUBLICATIONS

S. Dent, NVIDIA'S Quadro RTX 6000 should be the most powerful laptop GPU ever, engadget, ASUS, Sep. 4, 2019, 5 pages, https://www.engadget.com/2019-09-04-nvidia-quadro-rtx-6000-laptops.html.

Gordon Ung, News: Asus and Nvidia's ProArt StudioBook One wields Quadro RTX 6000 graphics power, dated Sep. 4, 2019, 8 pages, https://www.poworld.com/article/397990/asus-and-nvidia-proart-studlobook-one-with-quadro-rtx-6000-graphics-price-specs-features.html.

B. Steele, The ASUS StudioBook One is the first laptop with NVIDIA'S Quadro RTX 6000, engadget, Sep. 4, 2019, 7 pages, https://www.engadget.com/2019-09-04-asus-studiobook-one-announced-nvidia-quadro-rtx-6000.html.

* cited by examiner

VARIABLE FIN STACK

BACKGROUND

Field of the Disclosure

This disclosure relates generally to information handling systems and, more particularly, to portable information handling systems with variable fin stacks for cooling components.

Description of the Related Art

As the value and use of information continues to increase, individuals and businesses seek additional ways to process and store information. One option available to users is portable information handling systems. An portable information handling system generally processes, compiles, stores, and/or communicates information or data for business, personal, or other purposes thereby allowing users to take advantage of the value of the information. Because technology and information handling needs and requirements vary between different users or applications, portable information handling systems may also vary regarding what information is handled, how the information is handled, how much information is processed, stored, or communicated, and how quickly and efficiently the information may be processed, stored, or communicated. The variations in portable information handling systems allow for portable information handling systems to be general or configured for a specific user or specific use such as financial transaction processing, airline reservations, enterprise data storage, or global communications. In addition, portable information handling systems may include a variety of hardware and software components that may be configured to process, store, and communicate information and may include one or more computer systems, data storage systems, and networking systems.

SUMMARY

Portable information handling systems may include portable devices capable of operating in a mobile mode on battery power or as a workstation connected to a constant power source. When a portable information handling system is in a mobile mode operating on battery power, components may operate at a lower power, but when the portable information handling system is coupled to a constant power source, components may operate at a high speeds and generate more heat.

Embodiments of a variable fin stack may operate in a compact configuration based on a form factor of a chassis of a portable information handling system and may expand to operate in an expanded configuration to provide a greater surface area for transferring more heat from components operating at higher power levels.

A chassis for a portable information handling system may include a panel with a fixed portion and an expandable section. For use of the portable information handling system as a mobile device, the expandable section may be in a compact configuration to maintain the form factor of the chassis, and for use of the portable information handling system as a workstation, the expandable section may be expanded for increased surface area to cool of components operating at higher power levels.

A portable information handling system may include a panel with a fixed portion and an expandable section. For use of the portable information handling system as a mobile device, the expandable section may be in a compact configuration to maintain the form factor of the chassis, and for use of the portable information handling system as a workstation, the expandable section may be expanded for increased surface area to cool of components operating at higher power levels. A variable fin stack located near a vent in the chassis may operate in a compact configuration based on a form factor of a chassis of a portable information handling system and may expand to operate in an expanded configuration to provide a greater surface area for transferring more heat from components operating at higher power levels.

BRIEF DESCRIPTION OF THE DRAWINGS

For a more complete understanding of the invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72."

For the purposes of this disclosure, an portable information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an portable information handling system may be a personal computer, a consumer electronic device, a network storage device, or another suitable device and may vary in size, shape, performance, functionality, and price. The portable information handling system may include memory, one or more processing resources such as a central processing unit (CPU) or graphics processing unit (GPU) or hardware or software control logic. Additional components of the portable information handling system may include one or more storage devices, one or more communications ports for communicating with external devices as well as various input and output (I/O) devices, such as a keyboard, a mouse, and one or more video displays. The portable information handling system may also include one or more buses operable to transmit communication between the various hardware components.

Embodiments disclosed herein are described with respect to portable information handling systems in chassis. Particular embodiments are best understood by reference to FIGS. 1, 2A-2B, 3A-3B and 4A-4B, wherein like numbers are used to indicate like and corresponding parts.

Figure 1:
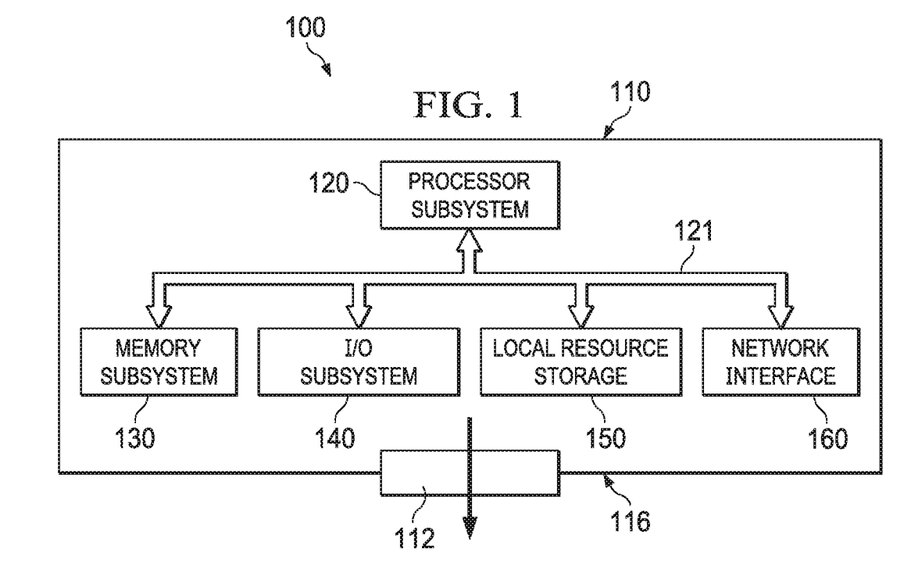
FIG. 1 is a block diagram of selected elements of an embodiment of a portable information handling system.

Turning to the drawings, FIG. 1 illustrates a block diagram depicting selected elements of an embodiment of portable information handling system 100 in chassis 110. It is noted that FIG. 1 is not drawn to scale but is a schematic illustration.

As shown in FIG. 1, components of portable information handling system 100 may include, but are not limited to, a processor subsystem 120, which may comprise one or more processors, and a system bus 121 that communicatively couples various system components to processor subsystem 120 including, for example, a memory subsystem 130, an I/O subsystem 140, local resource storage 150 and a network interface 160.

Processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory subsystem 130). In the same or alternative embodiments, processor subsystem 120 may interpret and execute program instructions and process data stored remotely (e.g., in a network storage resource). Processor subsystem 120 may include components such as a central processing unit (GPU) and a graphics processing unit (GPU), which may operate at different power levels and generate heat based on the power level.

System bus 121 may refer to a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Also depicted in FIG. 1, memory subsystem 130 may comprise a system, device, or apparatus operable to retain and retrieve program instructions and data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage or a suitable selection or array of volatile or non-volatile memory that retains data after power is removed.

In portable information handling system 100, I/O subsystem 140 may comprise a system, device, or apparatus generally operable to receive and transmit data to or from or within portable information handling system 100. I/O subsystem 140 may represent, for example, a variety of communication interfaces, graphics interfaces, video interfaces, user input interfaces, and peripheral interfaces. In various embodiments, I/O subsystem 140 may be used to support various peripheral devices, such as a touch panel, a display adapter, a keyboard, an accelerometer, a touch pad, a gyroscope, or a camera, among other examples. In some implementations, I/O subsystem 140 may support so-called 'plug and play' connectivity to external devices, in which the external devices may be added or removed while portable information handling system 100 is operating.

Local resource storage 150 may comprise computer-readable media (e.g., hard disk drive, floppy disk drive, CD-ROM, and other type of rotating storage media, flash memory, EEPROM, or another type of solid-state storage media) and may be generally operable to store instructions and data. For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory, such as a solid-state drive (SSD) comprising solid-state flash memory; as well as communications media such as wires, optical fibers, microwaves, radio waves, and other electromagnetic or optical carriers; or any combination of the foregoing.

Network interface 160 may be a suitable system, apparatus, or device operable to serve as an interface between portable information handling system 100 and a network (not shown). Network interface 160 may enable portable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

To maintain a compact form factor of chassis 110, chassis 110 may be configured with vent 112 formed on back panel 116. During operation of portable information handling system 100 in a mobile mode, power settings for processor subsystem 120 may be set to minimum levels to save battery power. In these settings, processor subsystem 120 may generate low heat such that minimal heat transfer through vent 112 is sufficient to cool components in chassis 110. During operation of portable information handling system 100 in a workstation mode, power settings for processor subsystem 120 may be set to maximum levels for faster computing. In these settings, processor subsystem 120 may generate heat quickly such that heat transfer through vent 112 is insufficient. For example, a CPU or other component of processor subsystem 120 may be designed to operate up to a thermal design power (TDP), which may result in the maximum amount of heat generated when running real applications. Accordingly, portable information handling systems must operate at less than TDP or be capable of dissipating heat from a component operating at TDP to prevent damage to the component.

Embodiments disclosed herein may include a variable fin stack configurable for heat transfer in a compact configuration when portable information handling system 100 is operating on battery power and configurable for greater heat transfer in an extended configuration when portable information handling system 100 is connected to a constant power source.

Figure 2A:
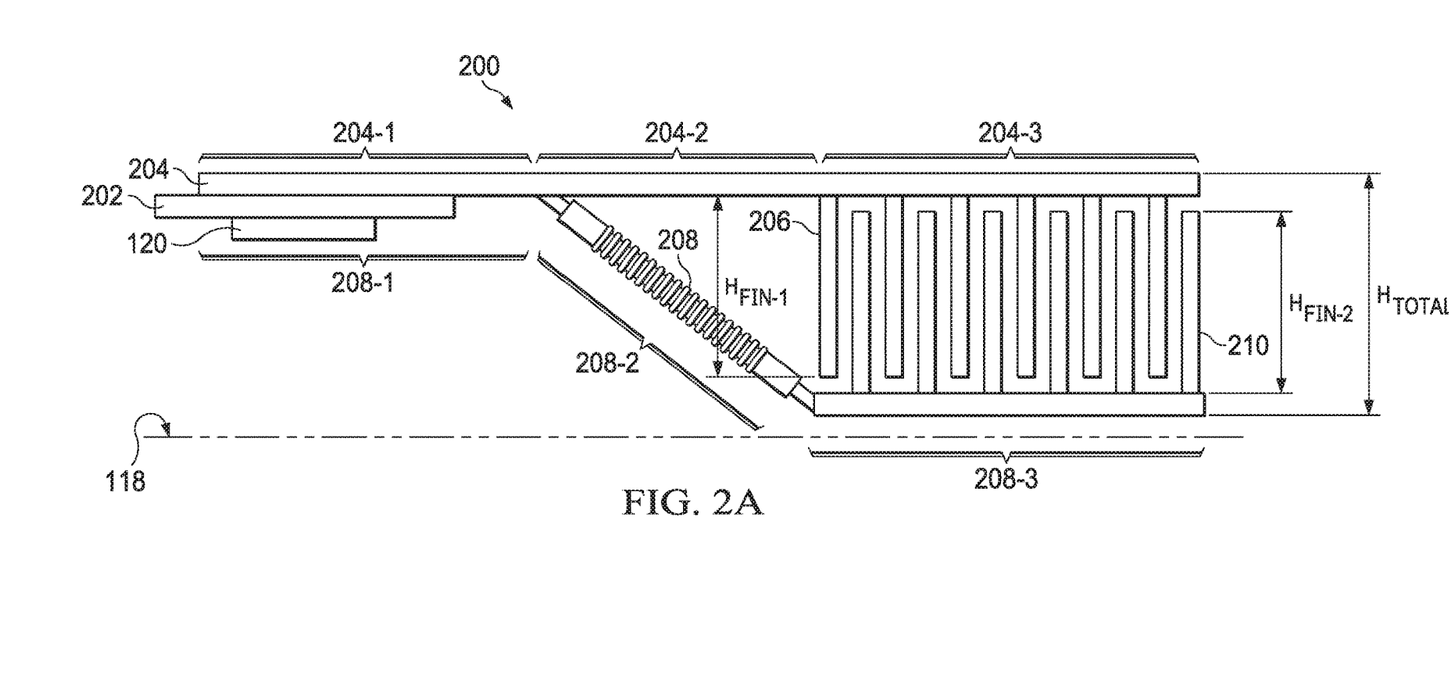
FIGS. 2A and 2B depict front views of a variable fin stack in a compact configuration for use in a mobile mode and in an expanded configuration for use in a workstation mode.
Figure 2B:
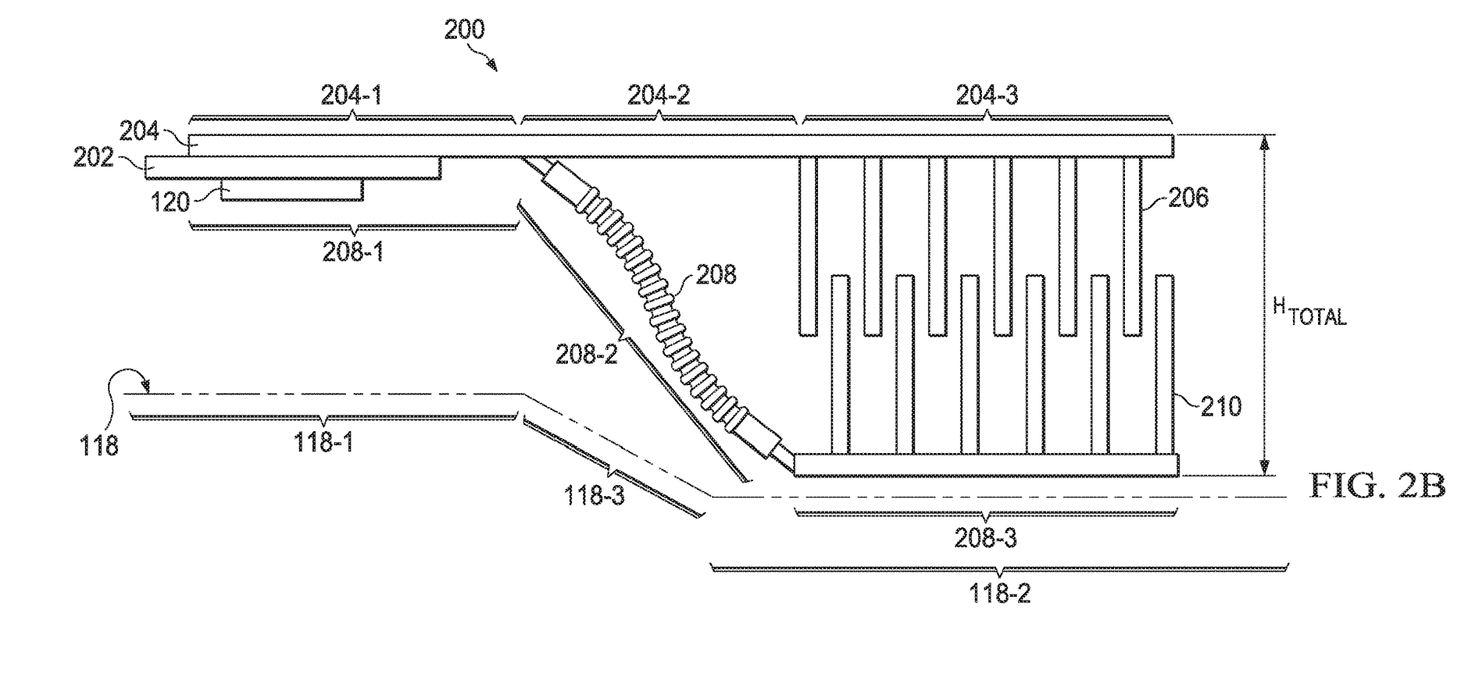

Referring to FIGS. 2A and 2B, embodiments of variable fin stack 200 may include a first conduit 204 having a first end 204-1 coupled to a cold plate 202, a fixed section 204-2 and a second end 204-3 coupled to a first array of fins 206. Variable fin stack 200 may further include a second conduit 208 having a first end 208-1 coupled to cold plate 202, variable section 208-2 and a second end 208-3 coupled to a second array of fins 210. One or more of conduit 204 and 208 may be a heat pipe. Second end 204-3 of first conduit 204 and second end 208-3 of second conduit 208 may extend along a length of vent 112 (not shown) such that airflow across variable fin stack 200 exits vent 112.

As depicted in FIGS. 2A and 2B, chassis 110 may be formed with bottom panel 118 configurable to form a substantially continuous surface in a compact configuration (depicted in FIG. 2A) but at least a portion of bottom panel 118 may expand (as depicted in FIG. 2B) to allow increased airflow through variable fin stack 200 and out of vent 112 on back panel 116. In some embodiments (not shown) one or more of vent 112 and back panel 116 may increase in height to allow bottom panel 118 to expand. In other embodiments, vent 112 may be configured to accommodate variable fin stack 200 in a compact configuration and an expanded configuration.

Chassis 110 may be in a compact configuration to maintain a smaller form factor when portable information handling system 100 is in a mobile mode and operating at low power settings based on conserving battery charge. Referring to FIG. 2A, when chassis 110 is in a compact configuration, panel 118 may form a substantially continuous surface to maintain the form factor of chassis 110.

Fins 206 may extend a first height ($H_{FIN-1}$) and fins 210 may extend a second height ($H_{FIN-2}$). In some embodiments, the first height ($H_{FIN-1}$) and the second height ($H_{FIN-2}$) are selected to ensure variable fin stack 200 has a total height ($H_{TOTAL}$) associated with a desired form factor. In some embodiments, the second height ($H_{FIN-2}$) of fins 210 may be substantially equal to the first height ($H_{FIN-1}$) of fins 206 such that fins 210 substantially overlap fins 206. Fins 210 may be positioned relative to fins 206. In some embodiments, fins 210 may be positioned midway between two adjacent fins 206 such that no contact occurs between fins 206 and 210. In some embodiments, each fin 210 may be positioned adjacent to a fin 206 such that contact occurs between each fin 206 and an adjacent fin 210. When portable information handling system 100 is operating under battery power, processor 120 may operate at a lower speed or power level such that fins 206 and 210 in variable fin stack 200 in a compact configuration may provide sufficient surface area for cooling a component coupled to cooling plate 202.

Chassis 110 may be in an expanded configuration to provide greater surface area for increased cooling of components operating at higher power levels. Referring to FIG. 2B, panel 118 may be formed with fixed section 118-1 and expandable section 118-2, wherein expandable section 118-2 may be offset from fixed section 118-1 to allow variable fin stack 200 to expand such that fins 210 are withdrawn from fins 206.

In some embodiments, chassis 110 may be configured to automatically offset expandable section 118-2 relative to fixed section 118-1 under certain conditions. For example, in some embodiments, chassis 110 may be configured for coupling with a docking station (not shown), wherein positioning chassis 110 in the docking station causes expandable section 118-2 to offset from fixed section 118-1. In some embodiments, when information handling system 100 is connected to a constant power source, a circuit may open or close to activate a solenoid, an actuator or another electromechanical system to offset expandable section 118-3 relative to fixed section 118-1 in an expanded configuration, wherein disconnecting from the constant power source causes a solenoid, an actuator or another electromechanical system to align expandable section 118-3 relative to fixed section 118-1 in a compact configuration. In some embodiments, chassis 110 may be configured to allow a user to manually offset expandable section 118-2 relative to fixed section 118-1. In some embodiments, a spring or other resilient member may apply tension to maintain panel 118 in a compact configuration. In some embodiments, a spring or other resilient member may apply a force to bias expandable section 118-2 to offset from fixed section 118-1 and a user must apply a force to configure panel 118 in a compact configuration.

As depicted in FIG. 2B, in some embodiments, panel 118 comprises flexible coupling 118-3 having a first edge coupled to fixed section 118-1 and a second edge coupled to expandable section 118-2. In some embodiments, expanding panel 118 withdraws fins 210 from fins 206. As depicted in FIG. 2B, in some embodiments, fins 210 may be withdrawn from fins 206 but still overlap at least a portion of fins 206. In some embodiments (not depicted), when portable information handling system 100 is configured in a workstation mode, fins 210 may be withdrawn from fins 206 such that no portion of fins 210 is between fins 206.

Figure 3A:
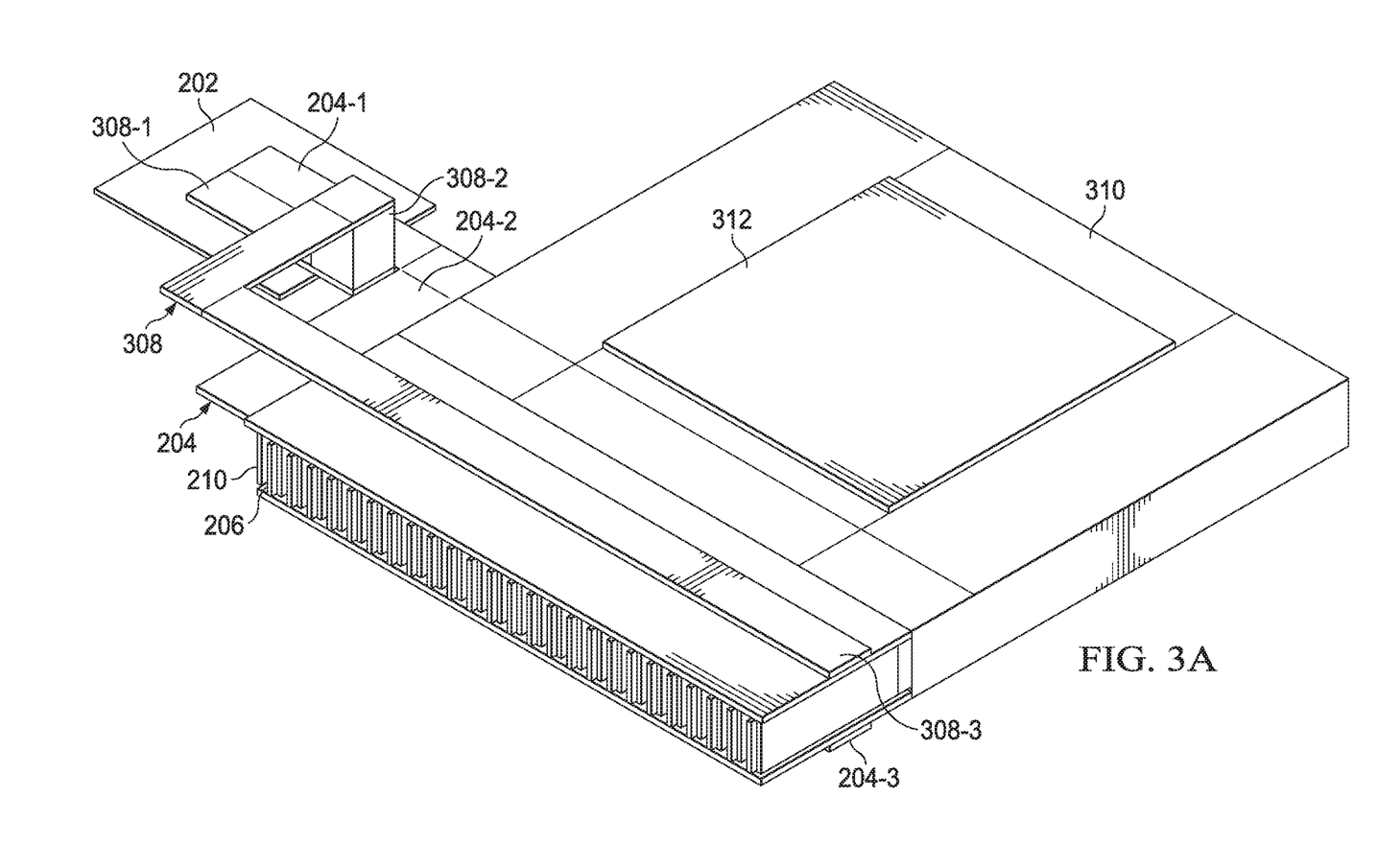
FIGS. 3A and 3B depict perspective views of a variable fin stack in a compact configuration for use in a mobile mode and in an expanded configuration for use in a workstation mode.
Figure 3B:
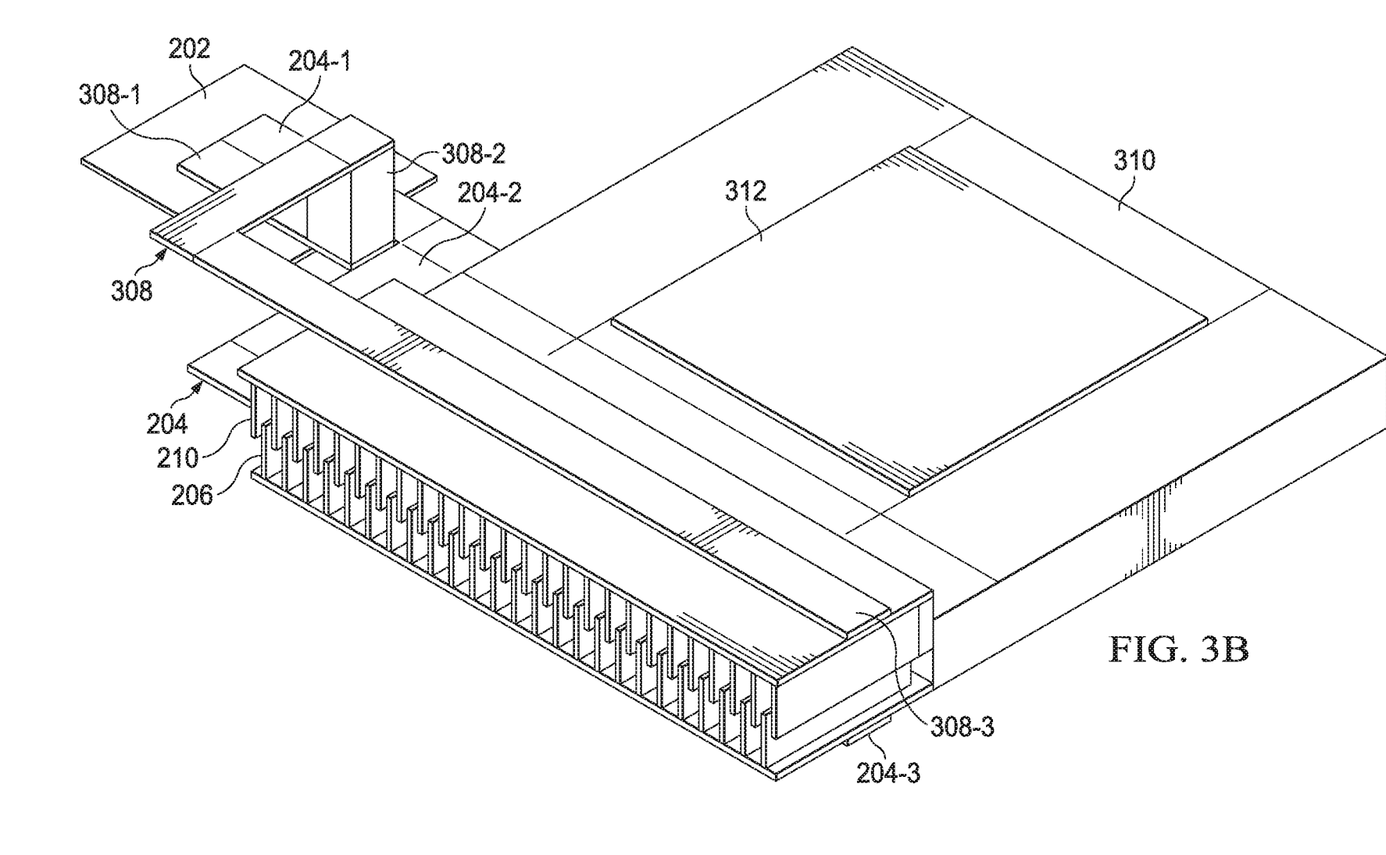

In some embodiments, a variable fin stack may comprise a conduit with a variable section comprising an expandable section. As depicted in FIGS. 3A and 3B, embodiments of variable fin stack 300 may include first conduit 204 comprising first end 204-1 coupled to cold plate 202, fixed section 204-2 for transferring heat from cold plate 202 and second end 204-3 coupled to fins 206, and may also include second conduit 308 comprising first end 308-1 coupled to cold plate 202, variable section 308-2 for transferring heat from cold plate 202 and second end 308-3 coupled to fins 210. As depicted in FIGS. 3A and 3B, variable section 308-2 comprises an expandable portion, discussed below in more detail.

Referring to FIG. 3A, variable fin stack 300 in a compact configuration may provide sufficient cooling of a component when portable information handling system 100 is operating under battery power. In a compact configuration, fins 210 may be positioned between fins 206 and variable section 308-2 may have a reduced height to maintain a form factor of chassis 110. A first volume of airflow generated by fan 310 may flow between fins 206 and 210 in variable fin stack 300 to remove heat through a vent such as vent 112 depicted in FIG. 1.

Referring to FIG. 3B, chassis 110 may be in an expanded configuration for increased cooling of components when portable information handling system 100 is connected to a constant power source and a component coupled to cooling plate 202 is operating at a higher speed or power level. As depicted in FIG. 3B, in some embodiments, a height of variable section 308-2 may be increased such that second end 308-3 of second conduit 208 moves relative to second end 304-3 of first conduit 304 and fins 210 may be withdrawn from fins 206. A second volume of airflow generated by fan 310 may flow between fins 206 and 210 in variable fin stack 300 to remove heat through a vent such as vent 112 depicted in FIG. 1, wherein variable fin stack 300 in an expanded configuration may allow a larger volume of airflow to move past fins 206 and 210. In some embodiments, surface 312 may be coupled to expandable section 118-2 of panel 118, wherein offsetting expandable section 118-2 from fixed section 118-1 withdraws fins 210 from fins 206.

As depicted in FIG. 3B, in some embodiments, fins 210 may be withdrawn from fins 206 but still overlap at least a portion of fins 206. In some embodiments (not depicted), when portable information handling system 100 is configured in a workstation mode, fins 210 may be withdrawn from fins 206 such that no portion of fins 210 is between fins 206. In some embodiments, a coupling between variable section 308-2 and first end 308-1 or second end 308-3 comprises a flexible coupling. In some embodiments, a coupling between variable section 308-2 and first end 308-1 or second end 308-3 comprises a rotatable coupling.

Figure 4A:
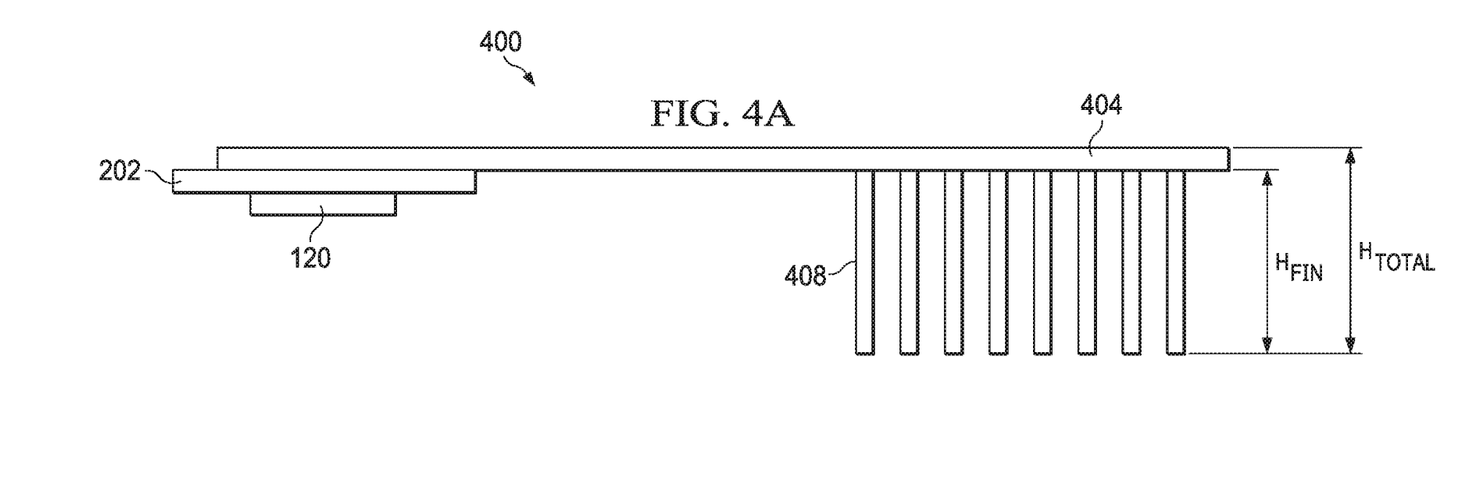
FIGS. 4A and 4B depict front and perspective views of a fixed fin stack approach optimized for use in a portable information handling system.
Figure 4B:
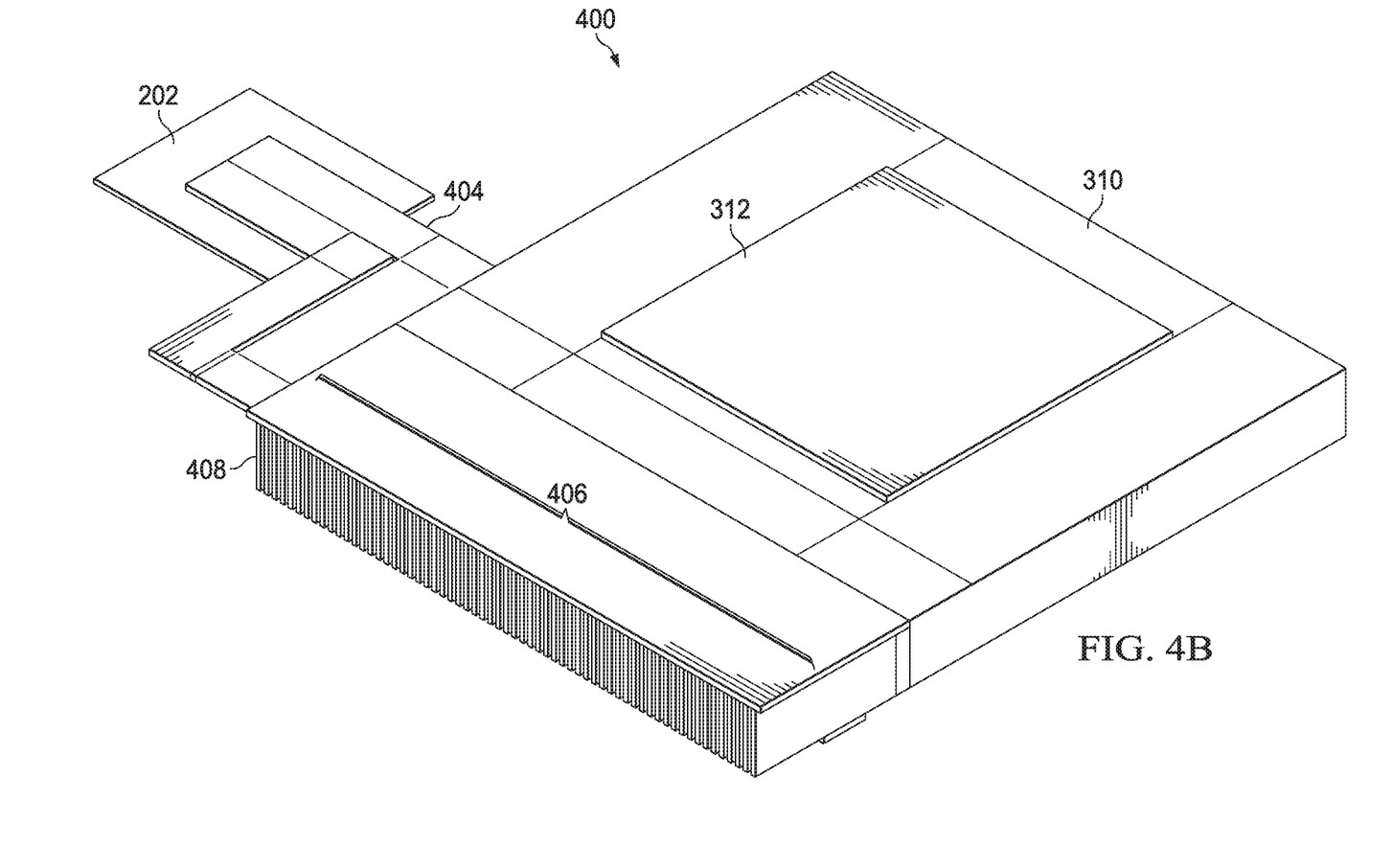

Embodiments disclosed herein may provide a greater surface area for cooling components in a workstation mode while allowing chassis 110 to maintain a form factor in a mobile mode. By way of example, FIGS. 4A and 4B depict views of a common approach to cooling a portable information handling system 100, in which a fin stack 400 is optimized with a number of fins 408 and a fixed height ($H_{FIN}$) based on a total height ($H_{TOTAL}$) associated with a form factor of chassis 100. Referring to FIGS. 4A and 4B, a typical fin stack 400 may have sixty fins 408 coupled to a single conduit 404 for removing heat from a cold plate 202 coupled to a component. Using this optimized approach, sixty fins 408 may be more fins than needed to cool a component when portable information handling system 100 is operating under battery power, but the surface area of fins 408 may be too small to effectively cool a component when portable information handling system 100 is operating at a higher power level as a workstation. Referring back to FIGS. 3A and 3B, embodiments disclosed herein may include twenty five fins 206 coupled to first conduit 304 and twenty five fins 210 coupled to second conduit 308, for a total of fifty fins. In a compact configuration, heat transfer from fins 206 and 210 in variable fin stack 200 or 300 may be less, but the components are already operating at lower power levels to conserve battery power such that less heat transfer is needed. In an expanded configuration with fins 210 at least partially withdrawn from fins 206, the increased surface area allows more heat transfer from components operating at high power levels. A comparison of simulated temperatures between chassis 110 comprising a variable fin stack 200, 300 and chassis 110 comprising fixed fin stack 400 indicates variable fin stack 200 or 300 may be capable of reducing the temperature of a component by up to 20% when portable information handling system 100 is operating at higher power levels, which may allow portable information handling system 100 to operate close to or at TDP.

The above disclosed subject matter is to be considered illustrative, and not restrictive, and the appended claims are intended to cover all such modifications, enhancements, and other embodiments which fall within the true spirit and scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A variable fin stack for a chassis of a portable information handling system, the variable fin stack comprising:
 a first array of fins coupled to a fixed section of the chassis, wherein each fin in the first array of fins has a first height;
 a second array of fins coupled to an expandable section of a panel in the chassis, wherein each fin in the second array of fins has a second height;
 a first conduit comprising:
  a first end coupled to a cooling plate;
  a second end coupled to the first array of fins; and
  a fixed section coupled to the first end of the first conduit and the second end of the first conduit; and
 a second conduit comprising:
  a first end coupled to the cooling plate;
  a second end coupled to the second array of fins; and
  a variable section coupled to the first end of the second conduit and the second end of the second conduit;
 wherein in a compact configuration, the expandable section of the panel and a fixed section of the panel form a substantially continuous surface, wherein each fin in the second array of fins overlaps a first portion of a fin in the first array of fins; and
 wherein in an expanded configuration, the expandable section of the panel is offset a distance from and parallel to the fixed section of the panel, wherein each fin in the second array of fins overlaps a second portion of the fin in the first array of fins less than the first portion.

2. The variable fin stack of claim 1, wherein the variable section of the second conduit comprises a flexible section.

3. The variable fin stack of claim 1, wherein the variable section of the second conduit comprises an expandable section.

4. The variable fin stack of claim 1, wherein each fin in the second array of fins is in contact with a fin in the first array of fins.

5. The variable fin stack of claim 1, wherein the compact configuration corresponds to an information handling system operating in a device mode and the expanded configuration corresponds to the information handling system operating in a workstation mode.

6. The variable fin stack of claim 1, wherein the second height is equal to the first height.

7. A chassis of a portable information handling system configurable for operating in a workstation mode and a mobile mode, the chassis comprising:
 a panel comprising a fixed section and an expandable section;
 a first array of fins coupled to the fixed section of the panel, wherein each fin in the first array of fins has a first height;
 a second array of fins coupled to the expandable section of the panel, wherein each fin in the second array of fins has a second height;

a first conduit comprising:
   a first end coupled to a cooling plate;
   a second end coupled to the first array of fins; and
   a fixed section coupled to the first end of the first conduit and the second end of the first conduit; and
a second conduit comprising:
   a first end coupled to the cooling plate;
   a second end coupled to the second array of fins; and
   a variable section coupled to the first end of the second conduit and the second end of the second conduit;
wherein in a compact configuration, the expandable section of the panel and the fixed portion of the panel form a substantially continuous surface, wherein each fin in the second array of fins overlaps a first portion of a fin in the first array of fins; and
wherein in an expanded configuration, the expandable section of the panel is offset a distance from and parallel to the fixed portion of the panel, wherein each fin in the second array of fins overlaps a second portion of the fin in the first array of fins less than the first portion.

8. The chassis of claim 7, wherein the variable section of the second conduit comprises a flexible section.

9. The chassis of claim 7, wherein the variable section of the second conduit comprises an expandable section.

10. The chassis of claim 7, wherein the expanded configuration corresponds to the information handling system operating in a workstation mode at a first power level and the compact configuration corresponds to the information handling system operating in a device mode at a second power level less than the first power level.

11. The chassis of claim 7, wherein the second height is equal to the first height.

12. The chassis of claim 7, wherein the panel comprises a bottom panel.

13. A portable information handling system, comprising:
   a chassis comprising:
     a panel comprising a fixed section and an expandable section;
     a first array of fins coupled to the fixed section of the panel, wherein each fin in the first array of fins has a first height;
     a second array of fins coupled to the expandable section of the panel, wherein each fin in the second array of fins has a second height;
     a first conduit comprising:
       a first end coupled to a cooling plate;
       a second end coupled to the first array of fins; and
       a fixed section coupled to the first end of the first conduit and the second end of the first conduit; and
     a second conduit comprising:
       a first end coupled to the cooling plate;
       a second end coupled to the second array of fins; and
       a variable section coupled to the first end of the second conduit and the second end of the second conduit;
   wherein, in a compact configuration, the expandable section of the panel and the fixed portion of the panel form a substantially continuous surface, wherein each fin in the second array of fins overlaps a first portion of a fin in the first array of fins; and
   wherein, in an expanded configuration, the expandable section of the panel is offset a distance from and parallel to the fixed portion of the panel, wherein each fin in the second array of fins overlaps a second portion of the fin in the first array of fins less than the first portion.

14. The portable information handling system of claim 13, wherein the variable section of the second conduit comprises a flexible section.

15. The portable information handling system of claim 13, wherein the variable section of the second conduit comprises an expandable section.

16. The portable information handling system of claim 13, wherein each fin in the second array of fins is in contact with a fin in the first array of fins.

17. The portable information handling system of claim 16, wherein the expanded configuration corresponds to the information handling system operating in a workstation mode at a first power level and the compact configuration corresponds to the information handling system operating in a device mode at a second power level less than the first power level.

18. The portable information handling system of claim 13, wherein the second height is equal to the first height.

19. The portable information handling system of claim 13, wherein the panel comprises a bottom panel.

20. The portable information handling system of claim 13, wherein:
   the second end of the second conduit is coupled to the panel; and
   configuring the expandable section of the panel offset from the fixed section of the panel withdraws the second array of fins from the first array of fins.

\* \* \* \* \*